(12) United States Patent
Mellar

(10) Patent No.: US 8,215,923 B2
(45) Date of Patent: Jul. 10, 2012

(54) CLUTCH CONTROL SYSTEM AND METHOD FOR OPERATING A CLUTCH CONTROL SYSTEM

(75) Inventor: Joerg Mellar, Pliening (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 12/841,460

(22) Filed: Jul. 22, 2010

(65) Prior Publication Data

US 2011/0020138 A1    Jan. 27, 2011

Related U.S. Application Data

(63) Continuation of application No. PCT/EP2009/000139, filed on Jan. 13, 2009.

(30) Foreign Application Priority Data

Jan. 22, 2008  (DE) .......................... 10 2008 005 437

(51) Int. Cl.
*F04B 49/00* (2006.01)

(52) U.S. Cl. ......... 417/223; 417/283; 417/302; 417/307

(58) Field of Classification Search ................... 417/282, 417/302, 307, 223
See application file for complete search history.

(56) References Cited

U.S. PATENT DOCUMENTS

| | | | |
|---|---|---|---|
| 4,697,091 A | | 9/1987 | Tamura |
| 5,114,315 A | * | 5/1992 | Kaltenthaler et al. .......... 417/18 |
| 2009/0127926 A1 | * | 5/2009 | Fries et al. ...................... 303/15 |

FOREIGN PATENT DOCUMENTS

| DE | 103 09 548 A1 | 9/2004 |
|---|---|---|
| DE | 10 2006 023 632 A1 | 11/2007 |

OTHER PUBLICATIONS

German Office Action dated Sep. 24, 2008 including English-language translation (Six (6) pages).
German Office Action dated Dec. 1, 2009 including English-language translation (Seven (7) pages).
International Search Report dated Aug. 27, 2009 including English-language translation (Four (4) pages).

* cited by examiner

*Primary Examiner* — Charles Freay
*Assistant Examiner* — Patrick Hamo
(74) *Attorney, Agent, or Firm* — Crowell & Moring LLP

(57) ABSTRACT

A system includes a compressor, a control unite and a clutch assigned to the compressor. The control unit is suitable for opening and closing the clutch in order to economize energy. The control unit is suitable for carrying out a monitoring routine during which the clutch is opened or closed in order to prevent the clutch, the compressor and the components arranged downstream of the compressor from being damaged. A method for controlling the system, including the compressor, the control unit and the clutch associated with the compressor, is also provided.

18 Claims, 9 Drawing Sheets

CLUTCH CONTROL SYSTEM AND METHOD FOR OPERATING A CLUTCH CONTROL SYSTEM

CROSS-REFERENCE TO RELATED APPLICATIONS

This application is a continuation of PCT International Application No. PCT/EP2009/000139, filed Jan. 13, 2009, which claims priority under 35 U.S.C. §119 from German Patent Application No. DE 10 2008 005 437.2, filed Jan. 22, 2008, the entire disclosures of which are herein expressly incorporated by reference.

BACKGROUND AND SUMMARY OF THE INVENTION

The invention relates to a system comprising a compressor, a control unit and a clutch which is assigned to the compressor, with the control unit being suitable for opening and closing the clutch in order to save energy.

The invention also relates to a method for controlling a system comprising a compressor, a control unit and a clutch which is assigned to the compressor, with the control unit opening and closing the clutch in order to save energy.

Modern commercial vehicles usually have a compressed air supply system which provides cleaned and dried compressed air for various systems of the commercial vehicle. For example, the service brakes and a possibly provided air suspension system of the commercial vehicle are supplied by the compressed air treatment system. The compressed air treatment system may have integrated within it a control unit for actuating the electric solenoid valves and for evaluating sensor signals. The solenoid valves may alternatively also be actuated according to various system parameters by an external control unit. Such control units receive further system parameters via a serial communication connection, for example the CAN bus. It is for example possible for data of the service brake and a possibly provided air suspension system to be transmitted to the compressed air treatment system. The compressed air treatment system itself receives the still non-cleaned and non-dried compressed air from a connected compressor. The energy for operating the compressor may be transmitted in a simple manner from the drive engine of the commercial vehicle to the compressor via a shaft.

Since the demand for compressed air within the commercial vehicle normally does not require continuous operation of the compressor, a clutch may be provided between the drive engine and the compressor in order to enable decoupling between the compressor and drive engine. This is desirable because the operation of the compressor consumes energy which can be saved if no compressed air is required, or if the present compressed air reserve can cover the compressed air demand of the consumers for a period of time. The idle phases during which energy can be saved in the decoupled state of the compressor are very long in particular in highway driving situations, since then the compressed air consumption, in particular by the service brake, is low.

In addition to the simple functionality for saving energy, the clutch may however also cause defects during the operation of the compressor and of the components connected downstream of the compressor, or the clutch itself may fail as a result of a defect.

The invention is based on the object of providing a compressor system which can detect defects of the system and automatically prevent at least some impending defects of the system.

This and other objects are achieved by a system and method of operating same, comprising a compressor, a control unit and a clutch which is assigned to the compressor, with the control unit being suitable for opening and closing the clutch in order to save energy. The control unit is suitable for carrying out a monitoring routine during the course of which the clutch is opened or closed in order to prevent damage to the clutch, the compressor and components situated downstream of the compressor.

The method is advantageously refined in that a slip of the closed clutch is monitored during the course of the monitoring routine. By monitoring the slip of the closed clutch, it is possible to detect increasing wear of the clutch or a defective closure of the clutch.

It may expediently be provided that an opening of the clutch is monitored during the course of the monitoring routine. By monitoring the opening of the clutch, it is possible to detect a defective switching, in particular an incomplete opening, of the clutch.

Furthermore, the monitoring routine may provide a minimum time period between two clutch actuations. Multiple actuations of the clutch within short periods of time result in intense wear on account of the disproportionate heating, and this leads to premature failure of the clutch. The provision of a minimum time period between two clutch actuations therefore increases the overall service life of the clutch.

It is also possible for the monitoring routine to provide a maximum time period during which the clutch is open. In the open state, the compressor situated downstream of the clutch is not in operation. The compressor is usually lubricated by means of oil which, during operation, is delivered continuously from an oil sump into the region between a piston and a cylinder wall. As a result of the opening of the clutch, the oil delivery is also stopped, wherein after a certain amount of time there will no longer be sufficient lubrication between the piston and the cylinder wall, since the oil which was originally present there has flowed back into the oil sump. Therefore, in the event of a re-start of the compressor as a result of a closure of the clutch, the result is increased abrasion to the piston and cylinder wall. This can be prevented by means of a maximum time period during which the clutch is open, because sufficient lubrication between the piston and cylinder wall can be ensured by means of re-delivery of oil.

It may be provided here in particular that the maximum time period during which the clutch is open is dependent on an ambient temperature. If the ambient temperature of the compressor is such that a delivery line situated downstream of the compressor can freeze, then it is possible in this way, in the event of the risk of frost, for the delivery line to firstly be deaerated and then blown dry such that condensation water is expelled. By means of cyclic activation of the compressor, it is possible for the delivery line to be consistently held at temperature with warm air.

It may expediently be provided that the compressor rotational speed is monitored during the course of the monitoring routine. If the determined compressor rotational speed is greater than a permitted maximum compressor rotational speed, then the compressor can be protected from mechanical damage by virtue of the clutch being opened.

It may also be provided that the clutch rotational speed is monitored during the course of the monitoring routine. The clutch may also be protected from mechanical overloading by monitoring the rotational speed, wherein the clutch is opened if the clutch rotational speed is too high.

It may expediently also be provided that, during the course of the monitoring routine, data are stored in order to permit a fault diagnosis or statistical evaluation. The storage of data makes a subsequent extended fault diagnosis possible, by which research can be carried out into the cause of the fault which has occurred, thereby permitting a further improvement in the system.

It may preferably be provided that, during the course of the monitoring routine, a warning signal is output if a component of the system is operating defectively. If the monitoring routine detects an irregularity with regard to the clutch or another part of the system, then as a result of the output of a warning signal, in the form of a warning lamp, an acoustic signal or a communication via a display of an on-board instrument, the vehicle driver can be informed and can initiate corresponding counter measures, in particular can seek a service station before a complete failure which would possibly prevent onward travel of the vehicle. Ideally, the clutch function is then deactivated in order to prevent further damage.

The invention also relates to a commercial vehicle having a system according to the invention.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 7 is a flow diagram for the partial aspect of the slip monitoring of the open clutch;

DETAILED DESCRIPTION OF THE DRAWINGS

Figure 1:
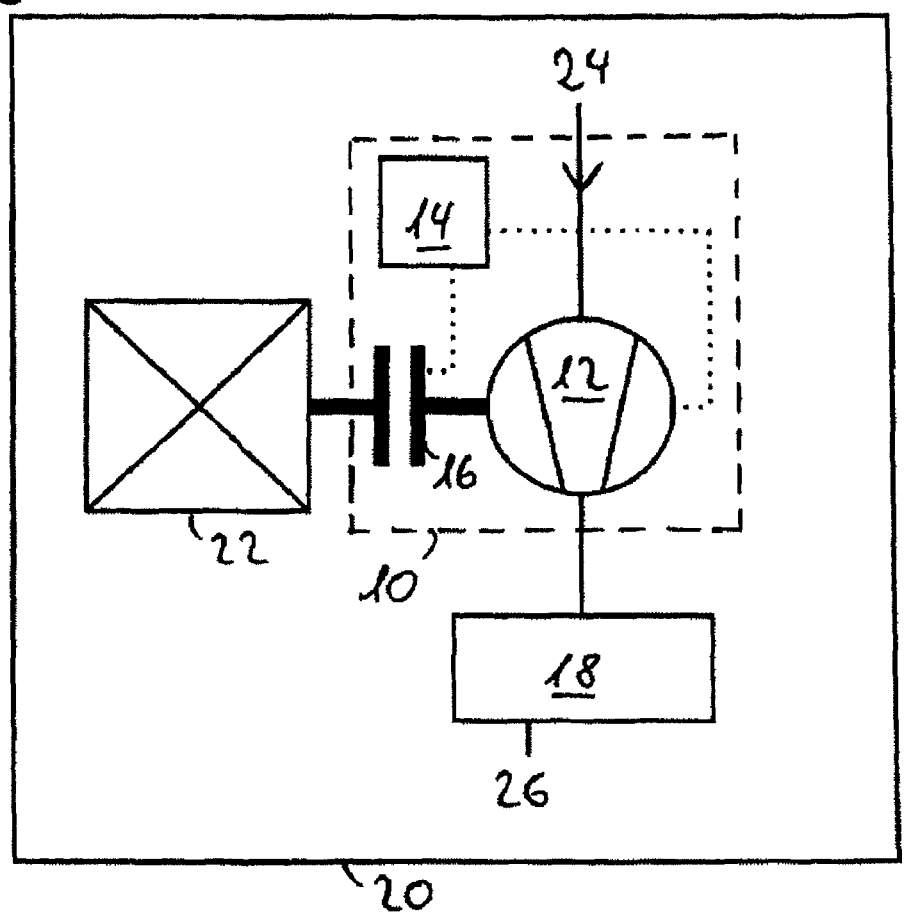
FIG. 1 is a schematic illustration of a commercial vehicle having a system according to the invention.

FIG. 1 is a schematic illustration of a commercial vehicle having a system according to the invention. A commercial vehicle 20 is driven by a drive engine 22, which also drives a compressor 12 via a clutch 16. The compressor 12 draws air from an air connection 24 and delivers the air in compressed form to a compressed air treatment system 18. The compressed air treatment system 18 in turn distributes the treated compressed air to consumers 26.

The compressor 12 together with the clutch 16 and a control unit 14 forms a system 10, which may also be referred to as the compressor system. The control unit 14 is coupled both to the clutch 16 and also to the compressor 12 and can open and close the clutch 16 and also influence the compressor 12, for example by switching a relief valve (not illustrated). The actuation of the relief valve takes place for example pneumatically, with the pressure build-up or dissipation taking place within 0.02 to 1.0 seconds.

Furthermore, the control unit 14 may also have a connection (not illustrated) to the CAN bus, via which fault messages can be transmitted to further control units (not illustrated) and parameters relating to the operating state of the vehicle can be received. The parameters may for example comprise an engine rotational speed, an ambient temperature, an ambient humidity, an engine torque, a charge pressure, a throttle pedal position and a brake pedal position. A housing which holds the control unit 14 should, in the usual way, protect the electronics from damaging environmental influences. Such a housing may be mounted on the compressor, on the drive engine or on the commercial vehicle chassis. To ensure simple maintenance, a modular exchange of the control unit and a data exchange with an external diagnostic device is possible.

Figure 2:
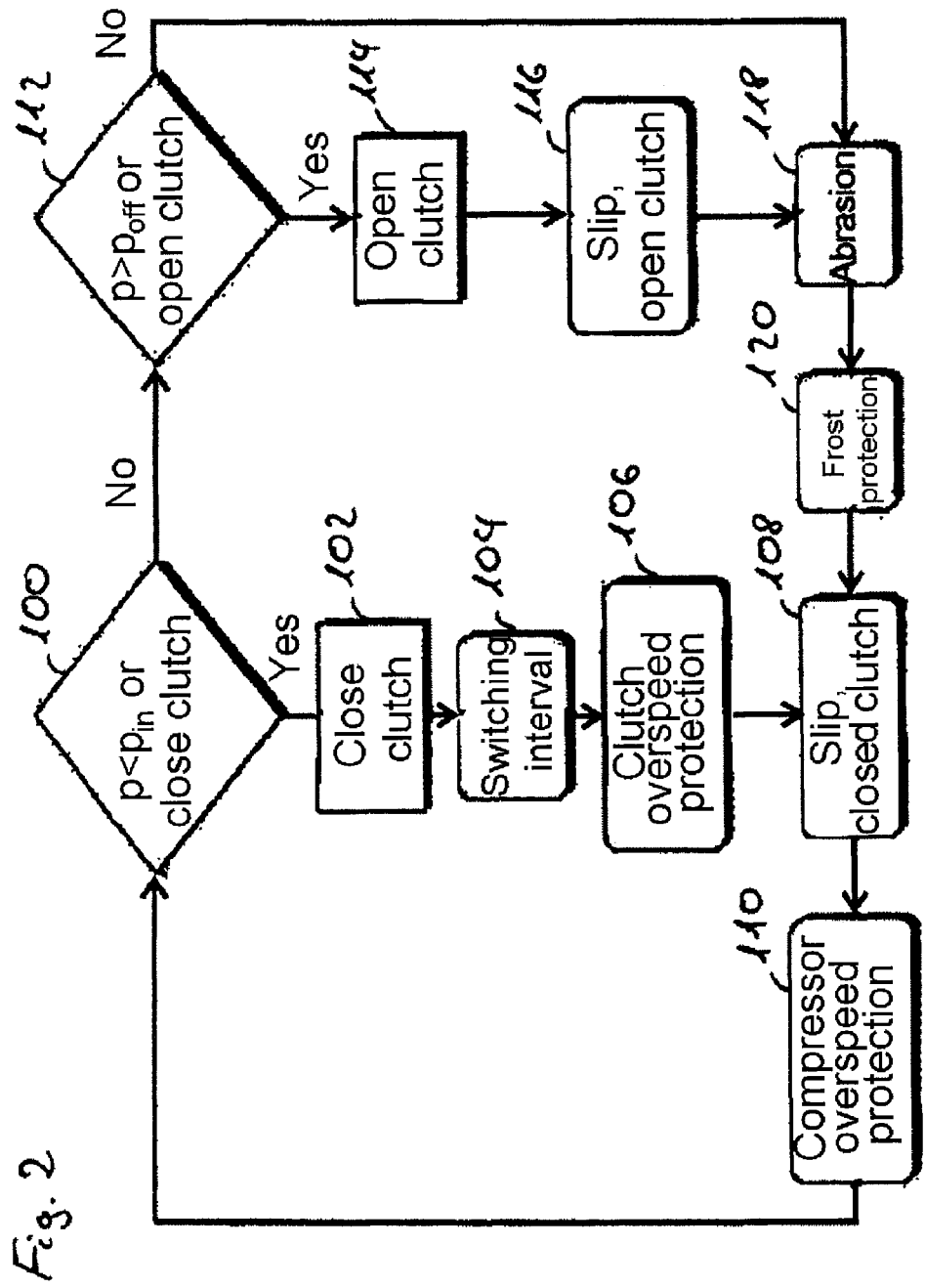
FIG. 2 is an overview of a monitoring routine in the form of a flow diagram.

FIG. 2 provides an overview of a monitoring routine in the form of a flow diagram. The illustrated monitoring routine encompasses both the pressure-induced switching of the clutch for saving energy and also sub-routines which are combined into different partial aspects and which will be explained in conjunction with the following drawings.

The step 100 is selected as a starting point. Here, it is checked whether a closure of the clutch is desired. The desire for a closure of the clutch may for example be pressure-induced if the pressure p in storage tanks of the commercial vehicle falls below an activation pressure $p_{in}$, or a closure of the clutch is requested via a vehicle bus arranged in the commercial vehicle on account of a defect outside the system. If such a desire is present, 100-yes, then in step 102 the clutch is closed. Subsequently, in step 104, the interval between two clutch actuations is monitored, which will be explained in more detail in conjunction with FIG. 3. An overspeed protection of the clutch is then realized in step 106, which will be explained in conjunction with FIG. 4. The process continues with step 108, in which the slip of the closed clutch is monitored. This will be explained in conjunction with FIG. 5. In step 110, an overspeed protection of the compressor is ensured, which will be explained in conjunction with FIG. 6. After step 110, the process continues with step 100.

If there is no desire to close the clutch, 100-no, then the process can continue with step 112. In this step, it is checked whether a demand for an opening of the clutch is present instead. Similarly to step 100, the demand may again be pressure-induced by virtue of the pressure p being greater than a deactivation pressure $p_{off}$, or an opening of the clutch being requested via the vehicle bus. If a demand is present for opening the clutch, 112-yes, then the clutch is opened in step 114. Subsequently, in step 116, the slip of the open clutch is monitored, which will be explained in conjunction with FIG. 7. In step 118, abrasion protection is then realized, which is described in conjunction with FIG. 8. From step 118, the process passes via the step 120, in which the frost protection described in FIG. 9 is realized, to step 108.

If no further request for opening the clutch is present, 112-no, then the process proceeds directly from step 112 to step 118.

Figure 3:
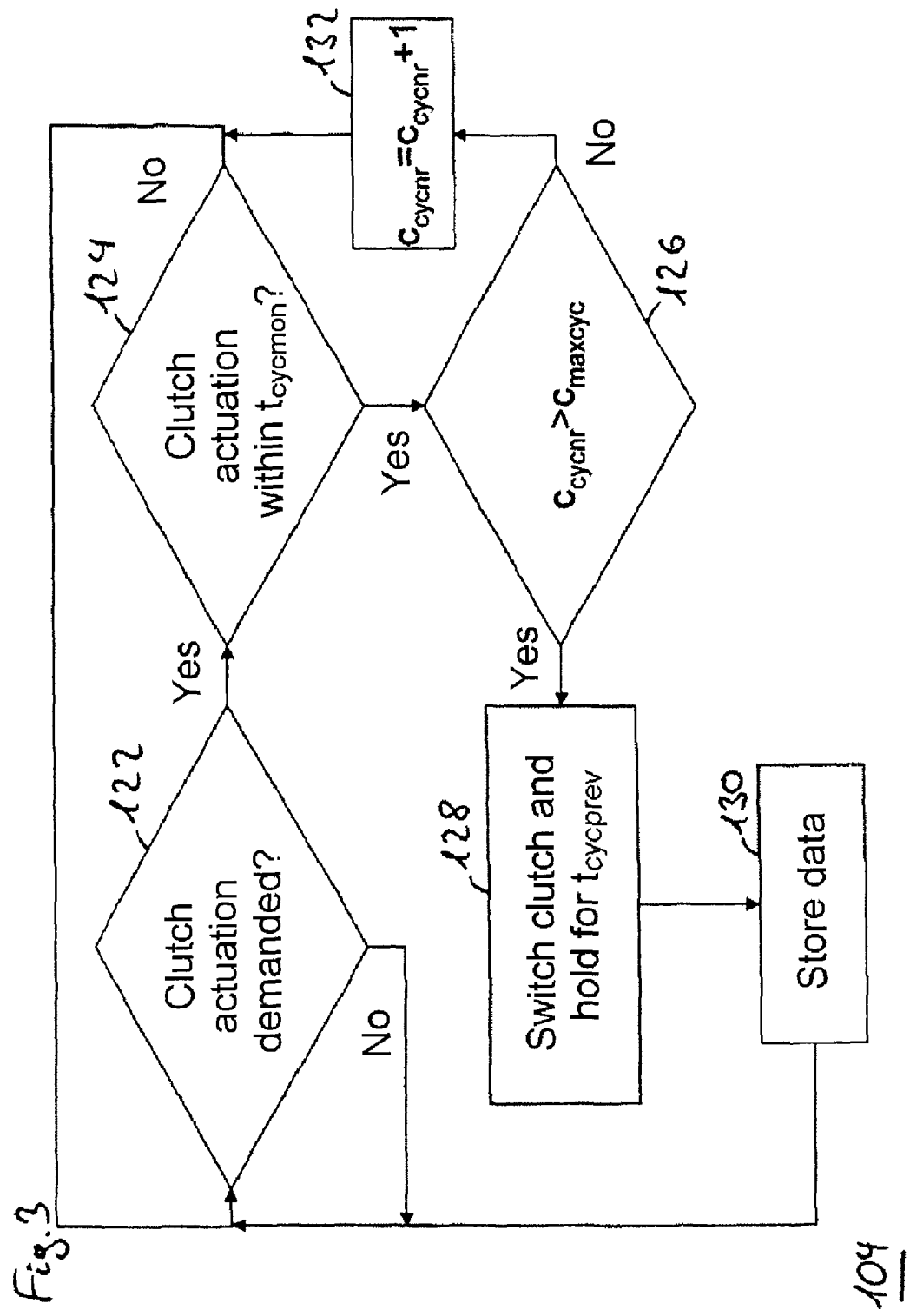
FIG. 3 is a flow diagram for the partial aspect of the switching interval monitoring.

FIG. 3 provides a flow diagram for the partial aspect of the switching interval monitoring. The illustrated flow diagram is a detailed illustration of the step 104 from FIG. 2. Proceeding from step 122, it is checked whether a clutch actuation is demanded. If yes, 122-yes, then it is checked in step 124 whether the clutch actuation lies within the time period $t_{cycmon}$ to be monitored. If yes, 124-yes, then it is subsequently checked in step 126 whether a counter $c_{cycnr}$ is greater than a maximum permitted value $c_{maxcyc}$. If yes, 126-yes, then in step 128 the clutch is switched and held in said state for a time period $t_{cycprev}$. On account of the arrangement of step 104 in the monitoring routine, the clutch is closed in step 128. Data relating to this procedure are stored in step 130, before the process continues with step 122.

If the clutch actuation does not lie within the monitored time period $t_{cycmon}$, 124-no, then after step 124 the process is continued with step 122.

If the counter $c_{cycnr}$ is not greater than the maximum permitted value $c_{maxcyc}$, 126-no, then in step 132 the counter $c_{cycnr}$ is increased by 1, and the process likewise continues with step 122.

Figure 4:
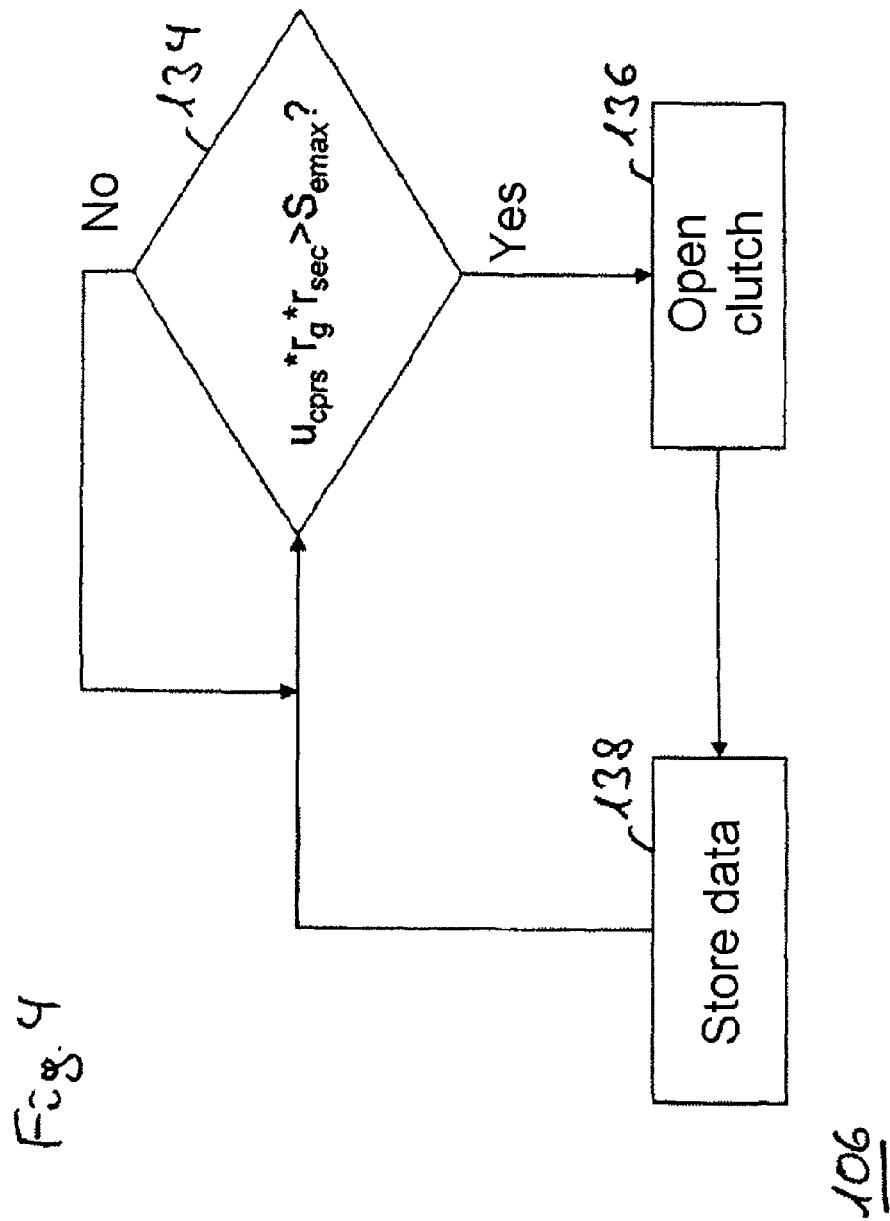
FIG. 4 is a flow diagram for the partial aspect of the overspeed protection of the clutch.

FIG. 4 provides a flow diagram for the partial aspect of the overspeed protection of the clutch. FIG. 4 is a more detailed illustration of the step 106 from FIG. 1. The starting point is step 134, in which it is checked whether a mechanical loading of the clutch is too great. For this purpose, the product of the compressor rotational speed $u_{cprs}$ and a transmission ratio $r_g$ and a safety parameter $r_{sec}$ is multiplied and compared with a maximum permitted engine rotational speed $S_{emax}$. If the maximum permitted engine rotational speed $S_{emax}$ is lower, 134-yes, then in step 136 the clutch is opened, in step 138 the relevant data are stored and the process continues with step 134.

If this is not the case, 134-no, then the process again continues with step 134.

Figure 5:
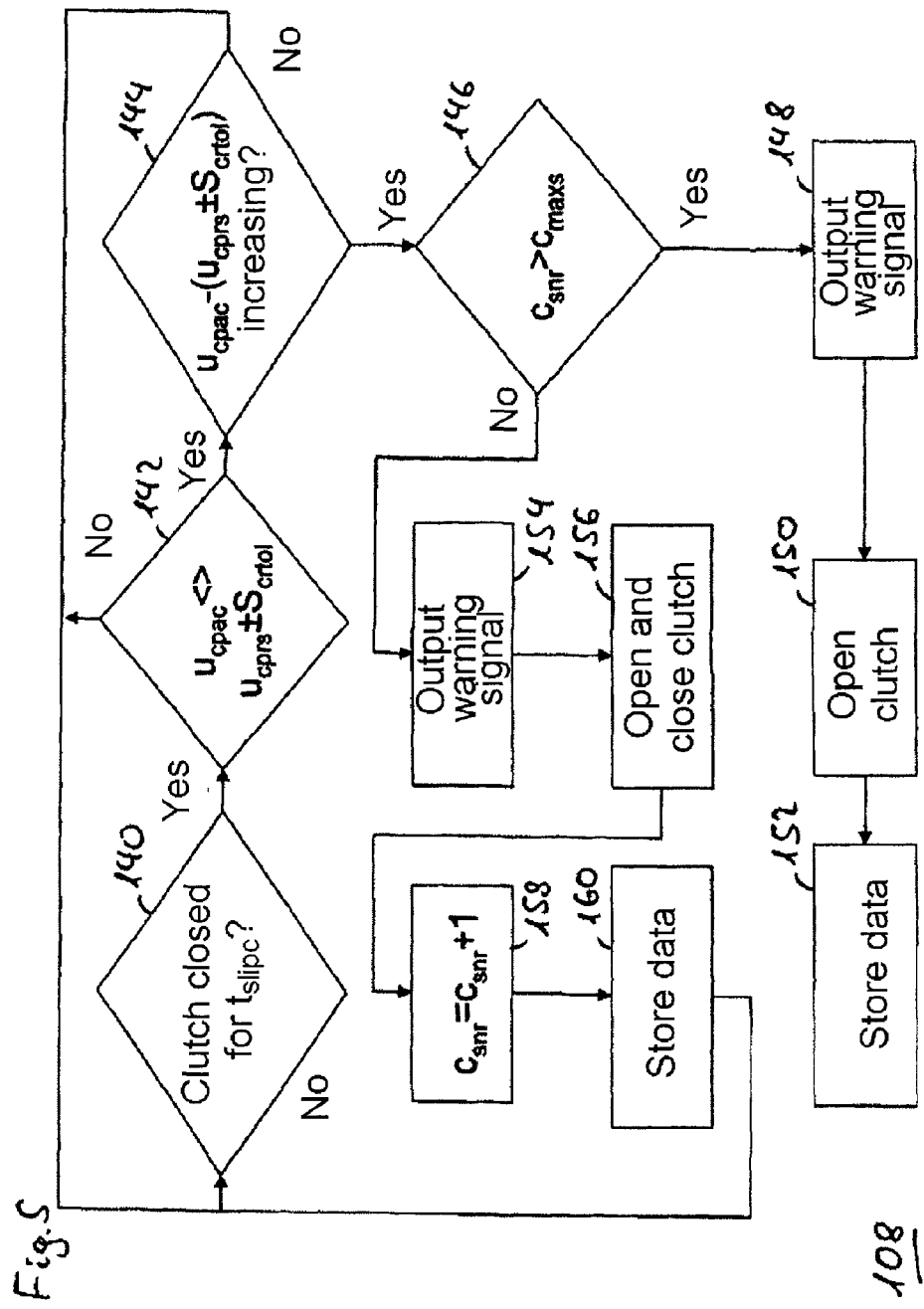
FIG. 5 is a flow diagram for the partial aspect of the slip monitoring of the closed clutch.

FIG. 5 provides a flow diagram for the partial aspect of the slip monitoring of the closed clutch. The illustrated flow diagram is a more detailed illustration of the step 108 illustrated in FIG. 2. Proceeding from step 140, it is checked whether the clutch has been closed for a time period $t_{slipc}$. If yes, 140-yes, then it is checked in step 142 whether the present compressor rotational speed $u_{cpac}$ is unequal to an expected compressor rotational speed $u_{cprs}$ plus/minus a tolerance value $S_{crtol}$. If yes, 142-yes, then it is checked in step 144 whether the difference between the present compressor rotational speed $u_{cpac}$ and the expected compressor rotational speed $u_{cprs}$ plus/minus the tolerance value $S_{crtol}$ increases within a time interval $t_{csi}$. If one of the three conditions is not met, 140-no, 142-no or 144-no, then the process continues in each case with step 140. If the condition in step 144 is met, 144-yes, then it is checked in step 146 whether a counter $c_{snr}$ is greater than a maximum permitted value $c_{maxs}$ for the counter. If yes, 146-yes, then in step 148 a warning signal is output, which may take place by means of a warning lamp, an acoustic warning signal, a text output on a display, etc. The output may be transmitted via the CAN bus to an executing control unit. Subsequently, in step 150, the clutch is opened, and in step 152, the procedure is documented by storing the relevant data.

If the condition of step 146 is not met, 146-no, then a warning signal is likewise output in step 154 similarly to step 148, and it is attempted in step 156 to eliminate the fault by opening and subsequently closing the clutch within a time period $t_{slipactoc}$. In step 158, the counter $c_{snr}$ is then increased by 1, and the relevant data are stored in step 160 before the process continues with step 140.

Figure 6:
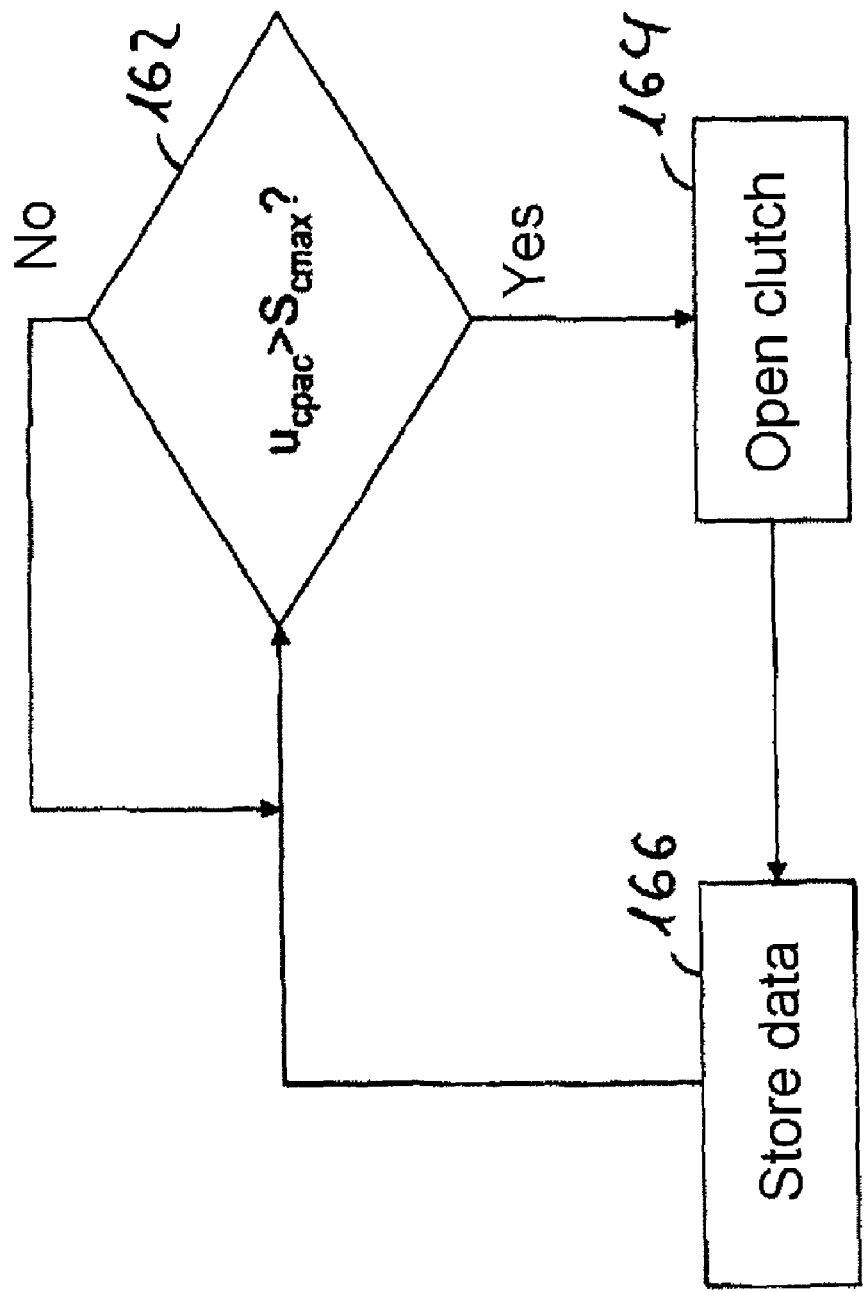
FIG. 6 is a flow diagram for the partial aspect of the overspeed protection of the compressor.

FIG. 6 is a flow diagram for the partial aspect of the overspeed protection of the compressor. Such an overspeed may occur as a result of the inadvertent selection of too low a gear stage. This flow diagram is a more detailed illustration of the step 110 illustrated in FIG. 2. It starts in step 162, in which it is checked whether the present compressor rotational speed $u_{cpac}$ is greater than a maximum admissible compressor rotational speed $s_{cmax}$. If yes, 162-yes, then the clutch is opened in step 164 and the relevant data are subsequently stored in step 166, before the process continues again with step 162. If no, 162-no, the process continues with step 162.

FIG. 7 is a flow diagram for the partial aspect of the slip monitoring of the open clutch. The flow diagram is a more detailed illustration of the step 116 illustrated in FIG. 2. Proceeding from step 168, it is first checked whether the clutch has been open for a time period $t_{slipo}$. If yes, 168-yes, then in step 170 it is checked whether the present compressor rotational speed $u_{cpac}$ is unequal to a minimum compressor rotational speed $S_{cmin}$, wherein the minimum value is zero in the event of a complete decoupling of the drive engine and compressor by the clutch. If one of the two conditions is not met, 168-no or 170-no, then the process continues with step 168. If the condition of step 170 is met, 170-yes, then it is checked in step 172 whether a counter $c_{sonr}$ is greater than a maximum admissible value $c_{maxso}$. If yes, 172-yes, then in step 174 a warning signal is output, which may take place by means of a warning lamp, an acoustic signal, a text output on a display, etc. The output may be transmitted via the CAN bus to an executing control unit. The clutch is then closed in step 176 and the procedure is subsequently stored on the basis of relevant data in step 178.

If the condition of step 172 is not met, 172-no, then a warning signal is likewise output in step 180, similarly to step 174. Subsequently, in step 182, the clutch is first closed and subsequently opened within a time period $t_{slipactco}$ in order to attempt to eliminate the fault. In step 184, the counter $c_{sonr}$ is then increased by 1 before the relevant data are stored in step 186. After step 186, the process continues again with step 168.

Figure 8:
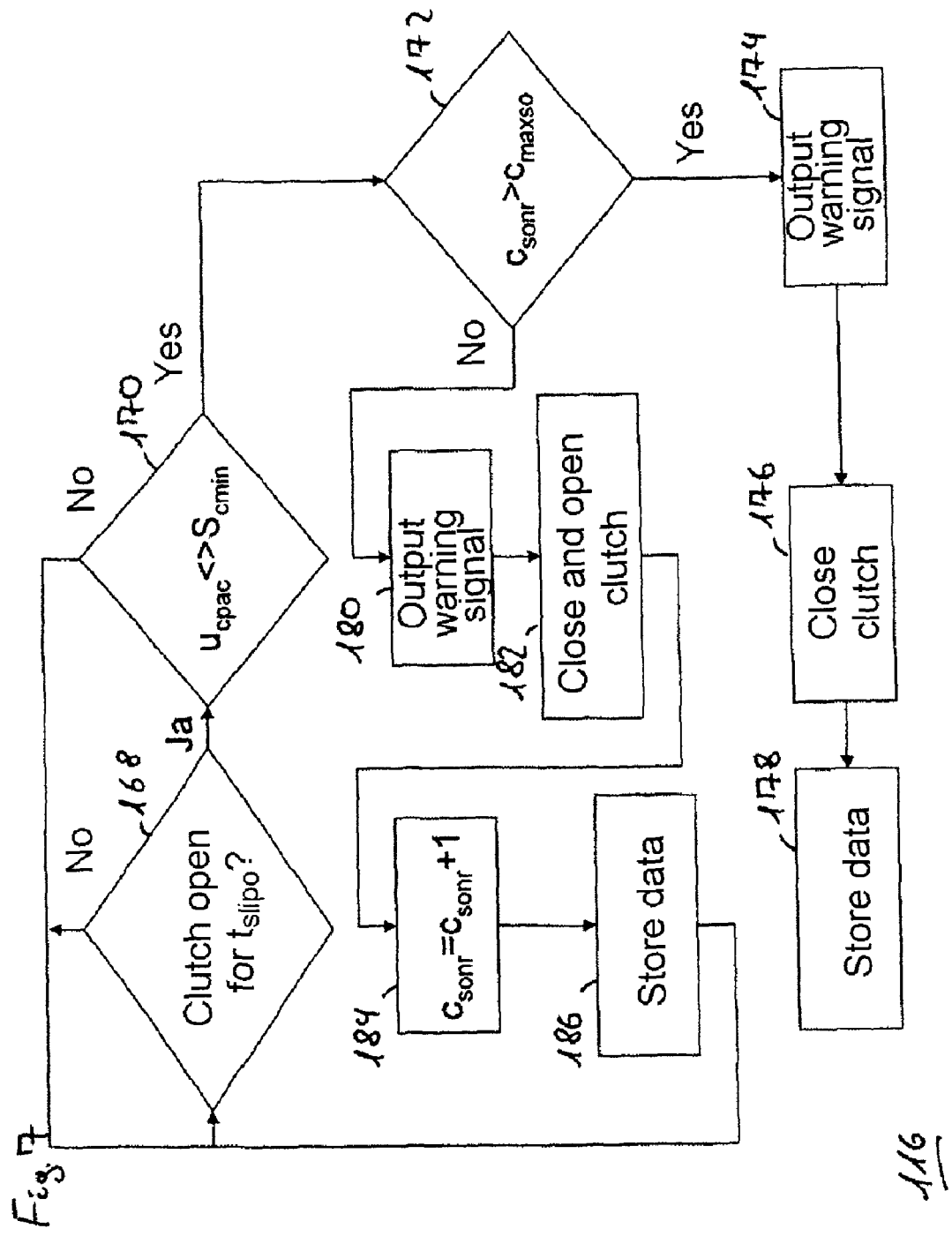
FIG. 8 is a flow diagram for the partial aspect of the abrasion protection.
Figure 8:
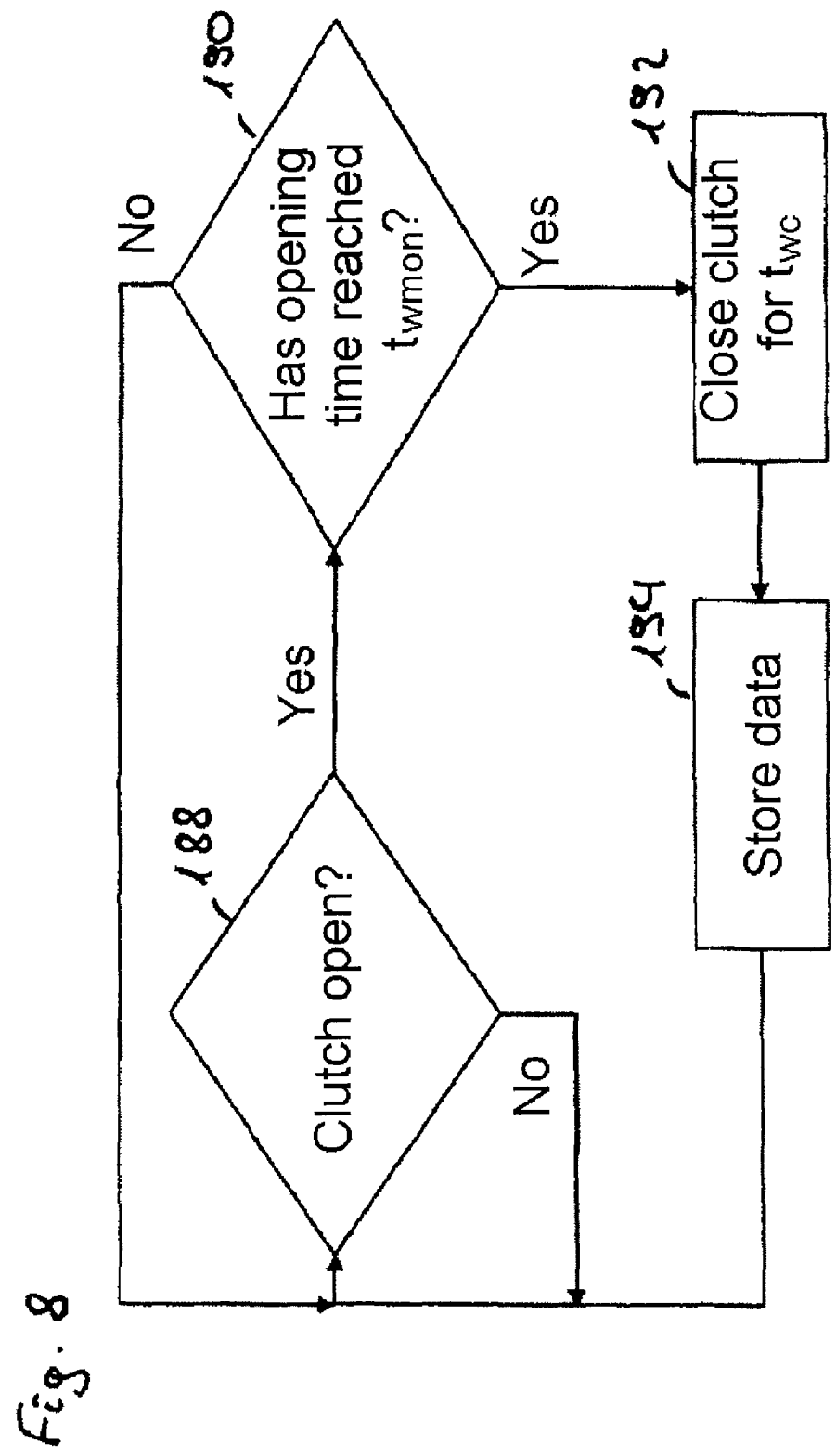
Figure 9:
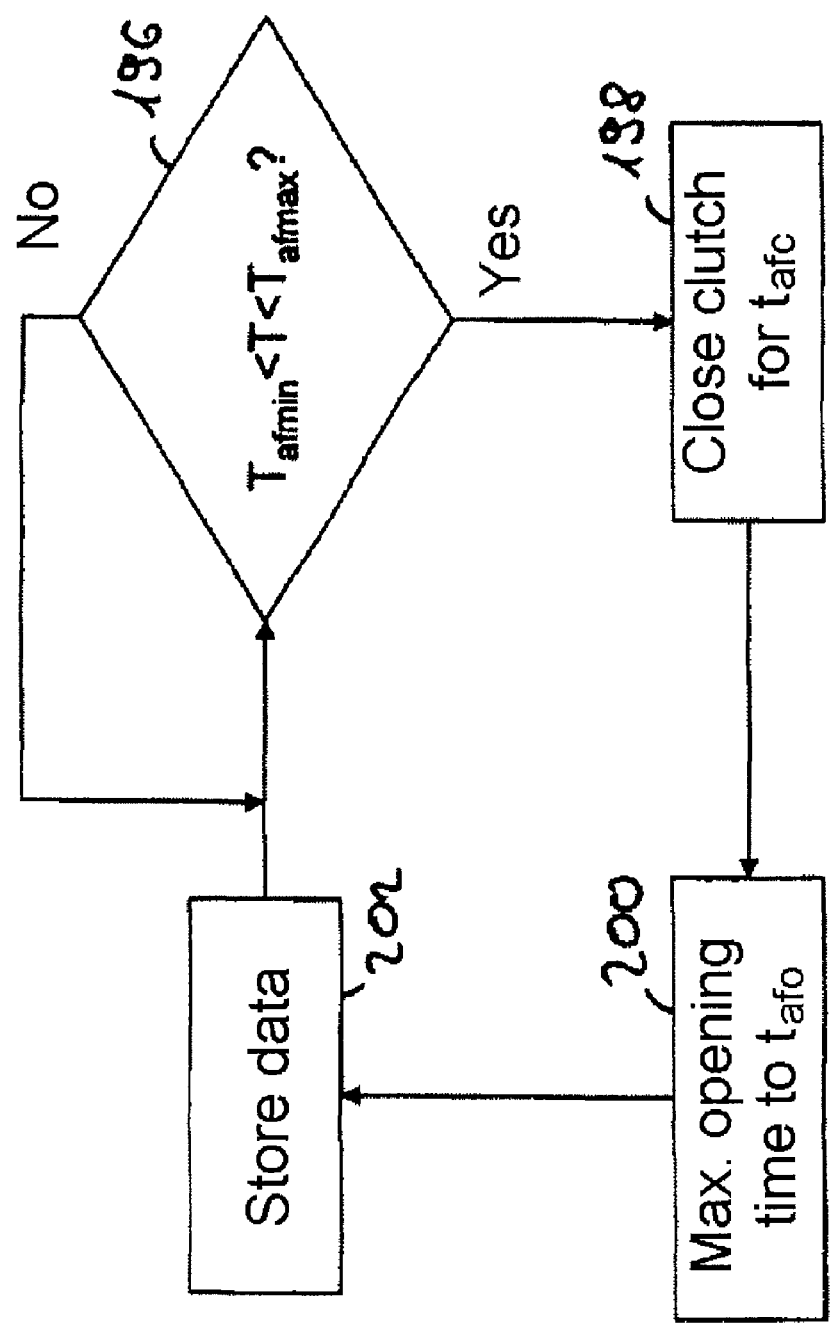
FIG. 9 is a flow diagram for the partial aspect of the frost protection.

FIG. 8 is a flow diagram for the partial aspect of the abrasion protection. The flow diagram illustrated in FIG. 8 is a more detailed illustration of the step 118 illustrated in FIG. 2. Proceeding from step 188, it is first checked whether the clutch is open. If yes, 188-yes, then it is checked in step 190 whether the opening time of the clutch has reached the time period $t_{wmon}$ to be monitored. If the condition of step 188 or step 190 is not met, 188-no or 190-no, then the process continues with step 188. If the condition of step 190 is met, 190-yes, then in step 192 the clutch is first closed for a time period $t_{wc}$ and then this procedure is stored in step 194, before the process continues in step 188.

FIG. 9 is a flow diagram for the partial aspect of the frost protection. The flow diagram illustrated in FIG. 9 is a more detailed illustration of the step 120 shown in FIG. 2. Proceeding from step 196, it is first checked whether an ambient temperature T lies between a minimum ambient temperature $T_{afmin}$ and a maximum ambient temperature $T_{afmax}$ and whether the maximum opening time $t_{afo}$ has been reached. If no, 196-no, then the process continues with step 196. If yes, 196-yes, then the clutch is first closed for a time period $t_{afc}$ in step 198, then in step 200 the maximum opening time is set to $t_{afo}$ and the relevant data are subsequently stored in step 202, before the process continues with step 196. It is contemplated for the air humidity of the environment to be taken into consideration in step 196, and for a check to be carried out in step 196, as an additional condition, as to whether the air humidity is greater than a minimum air humidity $H_{afmin}$. By means of this routine, it is advantageously possible after the system pressure has been reached for the delivery line to be blown dry even during the time period $t_{afc}$.

The flow diagrams illustrated in FIGS. 3 to 9 are of substantially cyclic configuration, but may also be illustrated as open-ended flow diagrams, with the starting point then corresponding to the first specified step and with it being possible for the one or more end points, or a return to the starting point without an increase of an index variable, to be assigned to the respective end point of the corresponding step from FIG. 2. The index variables used are in each case set back to zero after a time period $t_{rent}$ of approximately one hour if they have not changed within the time period. Furthermore, the following table specifies exemplary intervals for the different parameters used, which exemplary intervals are to be understood as guide values.

| Name | Interval | Preferred value |
|---|---|---|
| $p_{in}$ | 2.0-3.0 bar | 2.5 bar |
| $p_{off}$ | 5.0-15.0 bar | 12.5 bar |
| $t_{slipc}$ | 300-500 ms | 400 ms |
| $t_{slipo}$ | 300-500 ms | 400 ms |
| $t_{csi}$ | 2-7 sec | 5 sec |
| $t_{slipactoc}$ | 2-7 sec | 5 sec |
| $t_{slipactco}$ | 2-7 sec | 5 sec |
| $t_{afc}$ | 2-7 min | 5 min |
| $t_{afo}$ | 2-7 min | 5 min |
| $t_{rent}$ | 0.8-1.2 h | 1 h |
| $t_{cycmon}$ | 8-12 sec | 10 sec |
| $t_{cycprev}$ | 0.8-1.2 h | 1 h |
| $t_{wmon}$ | 12-18 min | 15 sec |
| $t_{wc}$ | 24-36 sec | 30 sec |
| $C_{maxs}$ | 2-5 | 3 |
| $C_{maxcyc}$ | 4-6 | 5 |
| $C_{maxso}$ | 2-5 | 3 |
| $T_{afmax}$ | 4-7° C. | 5° C. |
| $T_{afmin}$ | 0-2° C. | 1° C. |
| $H_{afmin}$ | 10-20% | 15% |
| $S_{cmax}$ | 2500-4000 rpm | 3300 rpm |
| $S_{emax}$ | 1900-3000 rpm | 2480 rpm |
| $S_{crtol}$ | 15-25% | 20% |
| $S_{cmin}$ | 0-10 rpm | 0 rpm |
| $r_g$ | | 0.5-1.5 |
| $r_{sec}$ | 1-1.5 | 1.1 |

| Table of Reference Numerals | |
|---|---|
| 10 | System |
| 12 | Compressor |
| 14 | Control unit |
| 16 | Clutch |
| 18 | Compressed air treatment system |
| 20 | Commercial vehicle |
| 22 | Drive engine |
| 24 | Air connection |
| 26 | Consumer |
| 100 | Clutch closure requested? |
| 102 | Close clutch |
| 104 | Switching interval |
| 106 | Clutch overspeed protection |
| 108 | Slip of closed clutch |
| 110 | Compressor overspeed protection |
| 112 | Clutch opening requested? |
| 114 | Open clutch |
| 116 | Slip of open clutch |
| 118 | Abrasion |
| 120 | Frost protection |
| 122 | Clutch actuation demanded? |
| 124 | Clutch actuation within $t_{cycmon}$? |
| 126 | $c_{cycnc}$ greater than $c_{maxcyc}$? |
| 128 | Switch clutch and hold for $t_{cycprev}$ |
| 130 | Store data |
| 132 | Increase $c_{cycnr}$ |
| 134 | Clutch rotational speed too high? |
| 136 | Open clutch |
| 138 | Store data |
| 140 | Clutch closed for $t_{slipc}$? |
| 142 | $u_{cpac}$ not equal to $u_{cprs} \pm S_{crtol}$? |
| 144 | $u_{cpac} - (u_{cprs} \pm S_{crtol})$ increasing? |
| 146 | $c_{snr}$ greater than $c_{maxs}$? |
| 148 | Output warning signal |
| 150 | Open clutch |

-continued

| Table of Reference Numerals | |
|---|---|
| 152 | Store data |
| 154 | Output warning signal |
| 156 | Open and close clutch |
| 158 | Increase $c_{snr}$ |
| 160 | Store data |
| 162 | $u_{cpac} > S_{cmax}$? |
| 164 | Open clutch |
| 166 | Store data |
| 168 | Clutch open for $t_{slipo}$? |
| 170 | $u_{cpac} <> S_{cmin}$? |
| 172 | $c_{sonr}$ greater than $c_{maxso}$? |
| 174 | Output warning signal |
| 176 | Close clutch |
| 178 | Store data |
| 180 | Output warning signal |
| 182 | Close and open clutch |
| 184 | Increase $c_{sonr}$ |
| 186 | Store data |
| 188 | Clutch open? |
| 190 | Has opening time reached $t_{wmon}$? |
| 192 | Close clutch for $t_{wc}$ |
| 194 | Store data |
| 196 | Temperature lower than $T_{afmin}$ or greater than $T_{afmax}$ |
| 198 | Close clutch for $t_{afc}$ |
| 200 | Set maximum opening time to $t_{afo}$ |
| 202 | Store data |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling a system comprising a compressor, a control unit and a clutch which is assigned to the compressor, the method comprising the acts of:
 performing a monitoring routine for the system; and
 during the course of said monitoring routine, monitoring a slip of the clutch, and opening or closing the clutch via the control unit to substantially prevent damage to at least one of the clutch, the compressor, and components arranged downstream of the compressor,
 wherein if the clutch is determined to be slipping, opening and subsequently closing the clutch within a first predetermined time period or closing and subsequently opening the clutch within a second predetermined time period to attempt to eliminate a fault, and if the clutch is determined to be continuing to slip opening the clutch after the first predetermined time period is exceeded or closing the clutch after the second predetermined time period is exceeded.

2. The method according to claim 1, wherein during said monitoring routine, a slip of the clutch when closed is monitored.

3. The method according to claim 1, wherein during the course of said monitoring routine, an opening of the clutch is monitored.

4. The method according to claim 1, wherein said monitoring routine provides a minimum time period between two clutch actuations.

5. The method according to claim 1, wherein said monitoring routine provides a maximum time period during which the clutch is open.

6. The method according to claim 3, wherein said monitoring routine provides a maximum time period during which the clutch is open.

7. The method according to claim 4, wherein said monitoring routine provides a maximum time period during which the clutch is open.

8. The method according to claim 5, wherein said maximum time period during which the clutch is open is dependent on an ambient temperature.

9. The method according to claim 7, wherein said maximum time period during which the clutch is open is dependent on an ambient temperature.

10. The method according to claim 1, wherein during said monitoring routine, a rotational speed of the compressor is monitored.

11. The method according to claim 2, wherein during said monitoring routine, a rotational speed of the compressor is monitored.

12. The method according to claim 3, wherein during said monitoring routine, a rotational speed of the compressor is monitored.

13. The method according to claim 1, wherein during said monitoring routine, a rotational speed of the clutch is monitored.

14. The method according to claim 10, wherein during said monitoring routine, a rotational speed of the clutch is monitored.

15. The method according to claim 1, wherein during said monitoring routine, data are stored whereby an evaluation is performable.

16. The method according to claim 1, wherein during said monitoring, a warning signal is output if a component of the system is operating defectively.

17. A system, comprising:
a compressor;
a control unit;
a clutch assigned to the compressor;
wherein said control unit is operatively configured for opening and closing the clutch in order to save energy; and
wherein said control unit is further operatively configured to perform a monitoring routine during which the clutch is opened or closed, said monitoring including monitoring a slip of the clutch, in order to substantially prevent damage to at least one of the clutch, the compressor and components arranged downstream of the compressor,
wherein if the clutch is determined to be slipping, opening and subsequently closing the clutch within a first predetermined time period or closing and subsequently opening the clutch within a second predetermined time period to attempt to eliminate a fault, and if the clutch is determined to be continuing to slip opening the clutch after the first predetermined time period is exceeded or closing the clutch after the second predetermined time period is exceeded.

18. A commercial vehicle, comprising:
an engine:
a compressor;
a control unit;
a clutch driven by the engine and assigned to the compressor, the clutch being arranged between the engine and compressor;
wherein said control unit is operatively configured for opening and closing the clutch in order to save energy; and
wherein said control unit is further operatively configured to perform a monitoring routine during which the clutch is opened or closed, said monitoring including monitoring a slip of the clutch, in order to substantially prevent damage to at least one of the clutch, the compressor and components arranged downstream of the compressor,
wherein if the clutch is determined to be slipping, opening and subsequently closing the clutch within a first predetermined time period or closing and subsequently opening the clutch within a second predetermined time period to attempt to eliminate a fault, and if the clutch is determined to be continuing to slip opening the clutch after the first predetermined time period is exceeded or closing the clutch after the second predetermined time period is exceeded.

* * * * *